Figure 1:
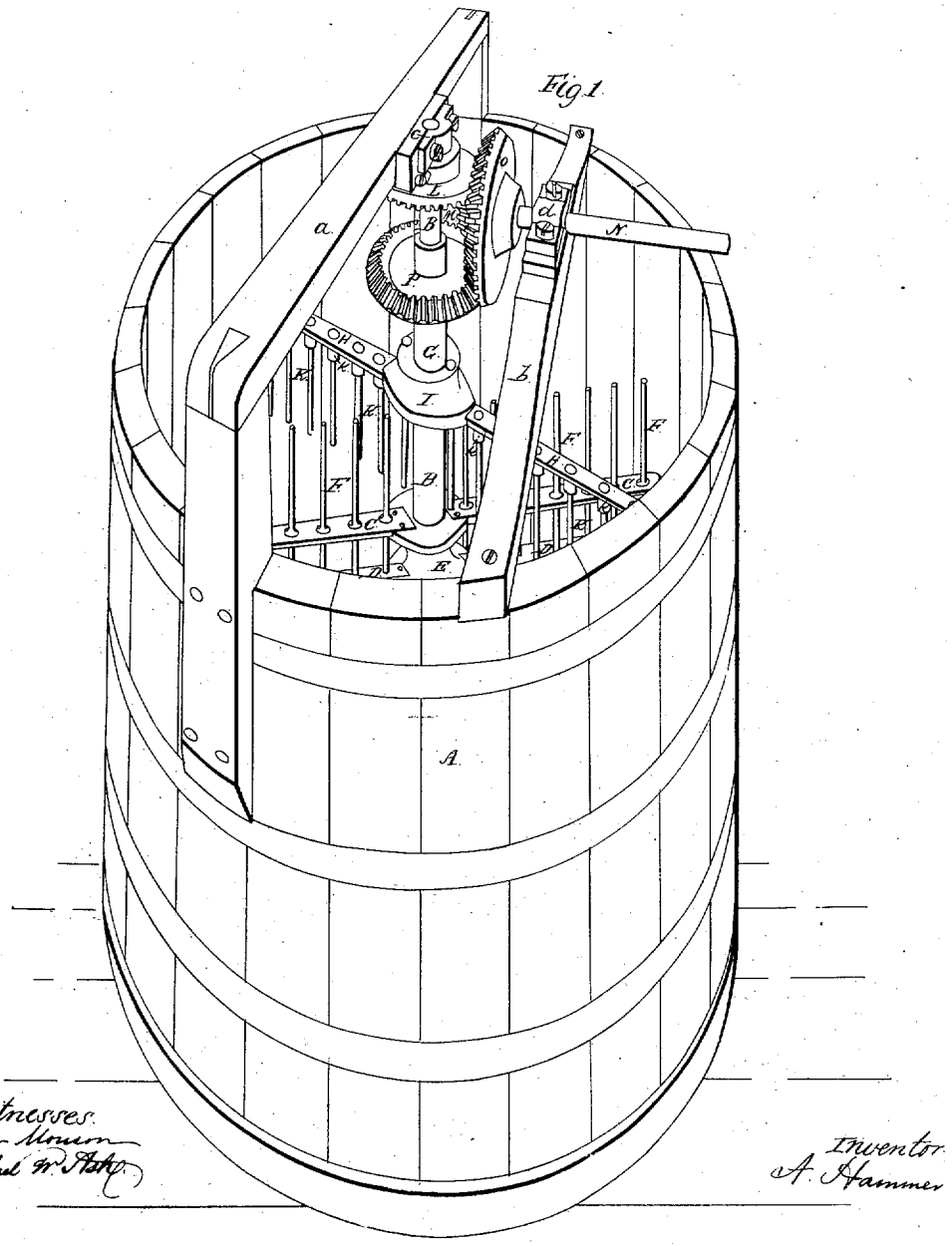

A. Hammer.

Mash Machine.

No. 2,002. Reissued Jun. 20, 1865.

Witnesses.
Benj. Amin Moore
Michael W. Stoltz

Inventor.
A. Hammer

A. Hammer.
Mash Machine.
No. 2,002. Reissued Jan. 20, 1865.
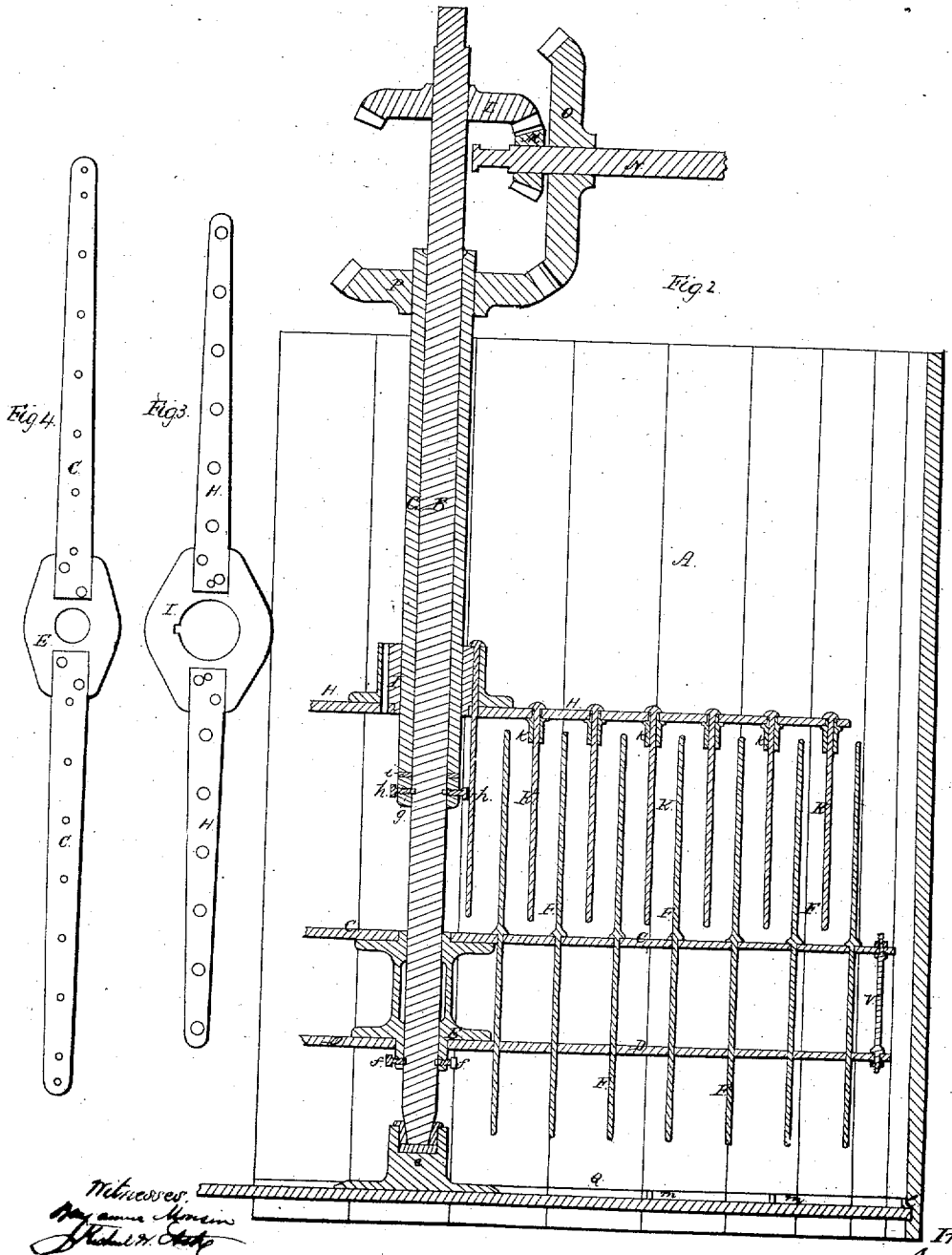
Witnesses:
Benjamin Minein
Thomas W. Clarke
Inventor:
A. Hammer

UNITED STATES PATENT OFFICE.

ADOLPH HAMMER, OF NEW YORK, N. Y.

IMPROVED MASH-TUN.

Specification forming part of Letters Patent No. 12,205, dated January 9, 1855; Reissue No. 2,002, dated June 20, 1865.

*To all whom it may concern:*

Be it known that I, ADOLPH HAMMER, of No. 132 West Thirty-fourth street, in the city, county, and State of New York, have invented a new and useful Improvement in Mash-Machines; and I do hereby declare that the following is a full, clear, and exact description thereof, which will enable others skilled in the art to make and use the same, reference being had to the accompanying drawings, forming part of this specification, in which—

Figure 1 represents a perspective view of this invention. Fig. 2 is a vertical central section of the same. Fig. 3 is a detached plan or top view of the upper rake-head. Fig. 4 is a similar view of the lower rake-head. Fig. 5 represents a detached plan or top view of a modification of the rake. Figs. 6 and 7 are elevation of teeth of different shape detached.

Similar letters of reference indicate like parts.

This invention consists in the construction and application to the mash-tun used by distillers of an upper or additional rake, adapted to operate in combination with the usual rake thereof or its equivalent in such a manner that by the combined action of the two rakes a more perfect and rapid mixture of the ground malt and water in the process of making the extract from malt is effected, and a more brilliant and richer extract is obtained from the same quantity of malt.

The invention consists also in so forming, constructing, and applying the teeth to the arms or heads of the rakes of a mash-machine that in operating the same the more dense particles of certain qualities of malt will be more effectually prevented from a too rapid precipitation in the fluid during the operation of mashing. This purpose is effected by arranging said teeth in inclined or oblique positions, and the effect is still further increased by curving said oblique teeth in the manner as hereinafter more fully described.

A is a large wooden vessel open at the top, called a "mash-tun." It has fixed across its upper end two strong pieces of wood, *a* and *b*, adapted for holding steadily in proper position the bearing *c* and *d*. In the center of the bottom, on the inside of the vessel, a suitable step or bearing, *e*, is also firmly secured.

B is a strong cylindrical and central iron shaft, adapted to rotate in a vertical position, being held by the step *e* and bearing *c*, and has secured to it near the lower end a double pair of arms, C and D, by means of a boss, E, through the center of which the shaft B is fixed and tightly held thereto by means of the two set-screws, *f f*. The arms C and D have their inner ends "let in" to the boss, and are fixed thereto by rivets or screw bolts, so as to extend out at right angles from two opposite sides of the shaft B parallel with each other and nearly to the sides of the vessel A. The two outer ends of each pair of these arms are also connected by means of a double shouldered stay, V, and screw-nuts. In suitable holes made at regular distances apart along the arms, a series of teeth, F, is placed in vertical positions, the upper ends reaching a little more than half way up the vessel, and the lower ends extending down to within about twelve inches of the bottom. These teeth, arms, and boss constitute what I call the "lower rake." Inclosing the middle portion of the shaft B is an outer shaft, G, adapted to rotate freely thereon while bearing upon a ring, *g*, which is fixed to the central shaft by means of the set-screws *h h*.

*i* is an intervening friction-collar. Near the lower end of this outer shaft a pair of single arms, H H, is fixed to a boss, I, through the center of which the shaft G is fixed tightly by means of set-screws or otherwise. These arms are let in to the lower end of the boss, and are fixed thereto by screw-bolts, so as to extend out toward the sides of the vessel A at right angles from two opposite sides of the shaft G. In suitable holes made along at regular distances apart through the arms a series of teeth, K K, is placed so as to extend downward, nearly to the upper arms of the lower rake, and also so as to be capable of passing freely between the upper projecting teeth of the same when the two shafts B and G are turned in the same or in opposite directions. In order to strengthen these teeth in position small bosses, *k*, are fixed tightly in the holes made in the heads, and through the centers of these bosses the teeth K are placed. These teeth, bosses, and heads constitute what I call the "upper rake." In both rakes the teeth are placed loosely, so as to be readily withdrawn at any time or left to remain in position by their own weight, those in the upper rake being suspended by a head and those in the lower one by means of a flange near their middle, the two inner teeth of the upper rake passing through the large or central boss, I. The teeth of both rakes I usually make of square section, or so as to present a flat face in the direction of their motion. Those of the lower rake may be placed in the arc $C^2$, as shown in Fig. 5, the bottom arm of this rake being dispensed with, so as to project forward from the upper side of the arm, and also downward in an inclined direction, as shown in Fig. 7, and they may be held each by a nut, $D^2$, which screws on to the end $E^*$ of the same and against the under side of the arm, so as to keep them firmly thereto, substantially as shown in Fig. 7, a slight depression being made across the arm from one side of each tooth-hole therein to receive the under part of the respective teeth, (as shown by the dotted lines at *x*,) for the purpose of preventing any lateral movement thereof or for holding them more firmly in position. Each tooth, besides having the downward inclination described, may also be bent in a curved form concentric with the shaft, as shown in Fig. 1. The teeth of the upper rake may be inserted in square holes made in the one arm, $H^2$, Fig. 5, from the under side, and they may be secured thereon by means of a screw-nut, $F^*$, as shown in Fig. 6. These teeth may each be formed and inserted so as to project perpendicularly downward from the arm about one foot, then forward and downward in an inclined direction, as shown in Fig. 2, each tooth being also bent in a curved form concentric with the central shaft, as shown in Fig. 5. The teeth may also be made to decrease in length as they approach the shaft, (see Fig. 5,) and when the shaft is rotated they have the effect of causing those particles of certain kinds of malt, which (having a greater specific gravity or being more dense than others) are inclined to sink too rapidly, to be forced upward and kept more perfectly suspended in the fluid (a matter of great importance) during the operation of mashing; and if the teeth are also curved concentrically with the central shaft, as before described, they pass through the mixture without imparting to it too much circular motion. Near the upper end of the central shaft, B, a bevel-wheel, L, is fixed, which gears in connection with a small bevel-pinion, M, fixed on or near the inner end of the driving-shaft N. On the same shaft N, and at a short distance from this pinion M, a larger bevel, O, is fixed, which gears in connection with a third bevel, P, fixed on the upper end of the outer shaft, G. The diameter of the bevel-wheel L is about three times that of the pinion M. The diameter of the wheel P is about three and a half times that of the pinion, and the diameter of the largest wheel O is about four times that of the pinion. The shaft N being extended and placed in connection with the driving-power, so as to give it rotation, the two rakes are necessarily caused to move round with the rotating shaft sat unequal speed and in opposite directions, the upper with about three or three and a half times the velocity of the lower one. About an inch or so above the bottom of the vestel A a plate-iron diaphragm, Q, perforated over its area with small holes about an inch apart, extends horizontally over the same, and rests upon a narrow and continuous ledge, *l*, projecting from the sides of the vessel, and also upon small blocks *m*, distributed between it and the bottom of the vessel.

Having thus fully described the machine, I will proceed to describe its operation during the process of mashing. In the first place, water of a proper temperature is run into the vessel A until its surface reaches about four inches above the lower ends of the teeth of the upper rake. Rotation is now given to the shafts, as before described, so that the central shaft, B, shall rotate about fifteen times in every minute, the outer shaft consequently rotating about forty-five or fifty times per minute, and in a contrary direction both carrying with them their respective rakes. The ground malt is now gradually run into the vessel from a chamber above, so as to fall near the center, when, from the action of the rakes in and above the water, each particle of the malt is perfectly separated from the others, and all thoroughly mashed or mixed intimately with the water. As the ground malt meets with the water in the vessel, its tendency is to float upon the surface, but by the action of the rakes it is rapidly incorporated therewith, and the mixture consequently rises gradually in height within the vessel. When the whole quantity of malt, however, is in, the surface of the mixture should not reach higher than about four inches below the upper ends of the lower teeth, F.

It will be perceived that by the action of the machine two opposite currents are made in the water, and should the rakes not separate all the finest particles of the malt from each other, the frictional action between the two currents of the water accomplishes the separation in the most perfect manner.

The whole of the malt being mashed, the motion of the machine is now arrested and the action of the diastase on the starch contained in the malt commences, and is allowed to proceed until all the starch is converted into saccharine matter, when the extract is drawn off, rich and brilliant, through suitable faucets previously inserted in the bottom of the vessel. The machine heretofore used for mashing malt, in consequence of its incomplete and defective character requires for three hundred bushels of malt from one to two hours to complete the process of mixing or mashing; and this in a very imperfect manner, as many of the particles of the malt are not separated from each other, and consequently the diastase, which is the converting substance in the malt, is prevented from acting upon the starch contained in these unseparated particles, and such starch remains undissolved, and therefore unconverted into saccharine matter, and lost to the brewer; besides, from the same causes, these malt particles adhering together are too rapidly precipitated after stopping the motion of the machine and form a too solid and glutinous mass upon the diaphragm, through which mass the liquor cannot readily pass, the ultimate effect being that in the subsequent process of drawing off the liquor forces numerous holes or separate courses through the mass, extracting or washing out the saccharine matter contained in those parts of the mass immediately around the holes or courses, but leaving the balance, which is a great deal, unextracted until subsequently washed out by adding fresh water, which, with what is left of the saccharine matter, necessarily washes out the undissolved starch and the injurious matters, as mucilage, &c., causing a turbid and clouded extract; whereas, by the use of my machine of a size adapted for three hundred bushels of malt, the process of mixing or mashing is thoroughly completed in about ten minutes, thus saving immensely in time, which is of great importance in an economical view, besides the quantity of saccharine matter obtained is greater and the quality of the extract necessarily much more rich, and also perfectly brilliant and free from starch.

It will be readily perceived that in mashing with the old machine the malt is kept in motion so long a time in the water that the air contained in the malt is driven out, and at the same time water is absorbed, increasing the weight of the malt without perfectly separating its particles, there is a consequent too rapid sinking thereof immediately after the motion of the machine is stopped, and thus there is formed the too solid mass upon the diaphragm, preventing the proper action of the diastase upon the starch and the subsequent free passage of the fluid extract through the same, resulting in the formation of the holes or separate courses, as before described, the mass in some instances becoming so stiff or compact as entirely to prevent the extract from passing through it, so that the whole brewing is sometimes lost, whereas by my process the time occupied in mashing is so short that the malt cannot absorb so much water nor lose so much air previous to the settling of the particles, and consequently, being lighter, the malt settles more slowly, forming a light spongy mass, which is most favorable to the action of the diastase, and the subsequent formation and separation of the saccharine matter with the fluid, the malt itself thus acting like a filter, allowing the liquor to run through between all the particles thereof in "drawing off," and insures the separation of all the saccharine matter, and consequently the production of a richer and more brilliant extract free from starch.

I construct the vessel or tun A of cedar wood, and the rakes, shafts, and wheels of iron. The rakes are combined with the shafts, so as to be adjustable to any position thereon suitable for any requisite quantity of malt to be mashed, and the shafts extended high enough above the open end of the vessel to admit the convenient application of a suitable cover to retain the heat.

Having thus described my invention, I claim as new and desire to secure by Letters Patent—

1. The application and use of the upper rake, constructed substantially as described, when combined with a mash-tun, so as to be rotated in opposite or in the same direction to that of the usual rake, substantially as and for the purpose set forth.

2. Making the rake-teeth of a mash-tun inclined, substantially as and for the purpose described.

3. Curving the teeth of the rake of a mash-tun substatially in the manner and for the purpose specified.

4. The use of inclined curved teeth in the rakes of a mash-tun, substantially as and for the purpose set forth.

A. HAMMER.

Witnesses:
W. HAUFF,
E. I. COOPER.